United States Patent [19]
Kakizawa et al.

[11] Patent Number: 5,539,575
[45] Date of Patent: Jul. 23, 1996

[54] IMAGE STABILIZED OPTICAL SYSTEM

[75] Inventors: Haruo Kakizawa; Kouichi Nagata, both of Saitama-ken, Japan

[73] Assignee: Fuji Photo Optical Co., Ltd., Saitama-ken, Japan

[21] Appl. No.: 433,021

[22] Filed: May 3, 1995

[30]  Foreign Application Priority Data

| May 10, 1994 | [JP] | Japan | 6-096508 |
| May 10, 1994 | [JP] | Japan | 6-096517 |
| May 10, 1994 | [JP] | Japan | 6-096533 |

[51] Int. Cl.[6] ............................................. G02B 27/64
[52] U.S. Cl. ............................ 359/554; 359/557; 354/70
[58] Field of Search ................................ 359/554, 555, 359/556, 557; 354/70, 410, 430, 202

[56]  References Cited

U.S. PATENT DOCUMENTS

| 4,013,339 | 3/1977 | Ando et al. | 350/16 |
| 4,235,506 | 11/1980 | Saito et al. | 350/16 |
| 4,318,584 | 3/1982 | Ando et al. | 350/10 |
| 5,181,056 | 1/1993 | Noguchi et al. | 354/202 |

*Primary Examiner*—Timothy P. Callahan
*Assistant Examiner*—Jung Ho Kim
*Attorney, Agent, or Firm*—Leydig, Voit & Mayer

[57]  ABSTRACT

An image stabilized optical system includes a casing; an objective system and an eyepiece system; a gimbal which is connected to the casing via a shaft and is capable of oscillating; an erect prism attached to the gimbal; a motor attached to the gimbal; an inertial rotor supported by a rotating rod of the motor; an oscillating member attached to the gimbal; a caging member rotatably attached to the casing, the caging member being capable of moving between a caging position where the caging member prevents oscillation of the oscillating member and an uncaging position where the oscillating member is capable of oscillating; operating force-transmitting means for transmitting an operating force to the caging member; and an elastic member. The elastic member energizes the caging member at the caging position in a direction of pressing the caging member against the oscillating member, and energizes the caging member at the uncaging position in a direction of separating the caging member from the oscillating member. A caging mechanism is simplified and easily operated compared to a conventional one, and weight and cost reductions and easy handling of the image stabilized optical system can be attained.

19 Claims, 10 Drawing Sheets

IMAGE STABILIZED OPTICAL SYSTEM

BACKGROUND OF THE INVENTION

1. Field of the Invention

The present invention relates to an optical system, such as binoculars or telescopes, with an image stabilization function.

2. Related Background Art

As a conventional image stabilized optical system, a system described in, e.g., U.S. Pat. No. 4,235,506 (corresponding to Japanese Patent Publication No. 57-37852) is known. The conventional image stabilized optical system described in this reference comprises a caging mechanism for holding a gimbal when this system is not used. This conventional mechanism comprises three claws for holding the gimbal in a closed state, a spring for applying a force only in a closing direction to the claws, and an operation button and a flexible cable connected thereto for transmitting a operating force of an operator to the claws to set the claws in an open state.

SUMMARY OF THE INVENTION

It is an object of the present invention to provide an image stabilized optical system in which a caging mechanism for caging oscillatable portions such as a gimbal and an erect prism is simplified and easily operated in comparison with a conventional mechanism, thereby achieving weight and cost reductions and facilitating handling.

It is another object of the present invention to provide an image stabilized optical system which can urge an operator to cage the oscillatable portions by giving a caution to the operator when the operator forgets to cage the oscillatable portions though the operator turns off a switch of a power supply for a motor of the image stabilized optical system.

It is still another object of the present invention to provide an image stabilized optical system which can automatically cage the oscillatable portions when a switch of a power supply for a motor of the image stabilized optical system is turned off, and the rotating speed of the motor which rotates an inertial rotor is lowered than a predetermined value.

The present invention is directed to an image stabilized optical system comprising:

a casing;

an objective system and an eyepiece system which are attached to the casing;

a gimbal which is connected to the casing via a shaft, so that said gimbal is capable of oscillating in tilting and panning directions;

an erect prism which is arranged between the objective system and the eyepiece system, and is attached to the gimbal;

a motor which is attached to the gimbal;

an inertial rotor which is supported by a rotating rod of the motor;

an oscillating member which is attached to the gimbal and is capable of oscillating together with the erect prism;

a caging member which is rotatably attached to the casing, the caging member being capable of moving between a caging position where the caging member keeps in contact with the oscillating member to prevent oscillation of the oscillating member, and an uncaging position where the caging member is separated from the oscillating member to allow the oscillating member to freely oscillate;

operating force-transmitting means for transmitting an operating force of an operator to the caging member to move the caging member between the caging position and the uncaging position; and an elastic member for energizing the caging member at the caging position in a direction of pressing the caging member against the oscillating member, and energizing the caging member at the uncaging position in a direction of separating the caging member from the oscillating member.

One aspect of the image stabilized optical system of the present invention further comprises an energizing direction-switching member which is rotatably attached to the casing, the energizing direction-switching member moving the caging member between the caging position and the uncaging position in cooperation with a rotating operation of the energizing direction-switching member, so that the elastic member energizes the casing member via the energizing direction-switching member, and the operating force-transmitting means transmits an operating force to the caging member via the energizing direction-switching member. It is preferable that the elastic member has a first end connected to a force receiving portion of the energizing direction-switching member, and a second end connected to a part of the casing; and the elastic member applies a tensile force between the force receiving portion and the casing, the tensile force temporarily becoming maximum while the caging member moves between the caging position and the uncaging position.

In the caging mechanism according to the present invention, the caging member and the operating force-transmitting means connected thereto are stably held (locked) at any one of the caging and uncaging positions by the elastic member. For this reason, an additional lock mechanism for holding the caging member at the caging position and/or the uncaging position need not be provided to another member such as the operating force-transmitting means. Therefore, the caging mechanism according to the present invention has a simple arrangement as compared to a conventional one, and the use of the caging mechanism according to the present invention achieves weight and cost reductions of the image stabilized optical system. Further, when the caging mechanism according to the present invention is to be operated, an operator need not release any additional lock mechanism, so the caging mechanism according to the present invention is easily operated.

Further, the present invention is directed to an image stabilized optical system comprising the casing; the objective system and the eyepiece system; the gimbal; the erect prism; the motor; the inertial rotor; the oscillating member; the caging member; the operating force-transmitting means; and a caution device for generating a caution when the caging member is at the uncaging position, and a rotating speed of the motor is lower than a predetermined value.

In one aspect of the image stabilized optical system of the present invention, the caution device comprises:

means for detection of uncaging, which detects that the caging member is at the uncaging position and generates a signal;

means for detection of the rotating speed of the motor, which detects that the rotating speed of the motor becomes lower than the predetermined value and generates a signal;

a gate which receives the signals generated by the means for detection of uncaging and the means for detection of the rotating speed of the motor and generates an output signal based on both the received signals; and means for generation of a caution for generating a caution based on the output signal.

In the image stabilized optical system of the present invention with the caution device according to the present invention, the caution device generates a caution when the caging mechanism for caging the oscillation of the erect prism and the like is at the uncaging position, and the rotating speed of the motor which rotates the inertial rotor at high speed is lowered than a predetermined value. Therefore, in the image stabilized optical system of the present invention, a caution is given to an operator when the operator forgets to cage the oscillatable portions though the operator turns off the switch of the power supply for the motor of the image stabilized optical system. For this reason, the failure of the image stabilized optical system which would be caused by carrying the system while the oscillatable portions are uncaged can be prevented reliably.

Furthermore, the present invention is directed to an image stabilized optical system comprising the casing; the objective system and the eyepiece system; the gimbal; the erect prism; the motor; the inertial rotor; the oscillating member; the casing member; means for detection of a rotating speed of the motor, which detects that the rotating speed of the motor becomes lower than a predetermined value and generates a signal; and an actuator which receives the signal generated by the means for detection of the rotating speed of the motor and moves the caging member based on the received signal.

One aspect of the image stabilized optical system of the present invention further comprises a timer for keeping the actuator in an operating state for a predetermined period of time. Further, the actuator according to the present invention comprises a motor, and driving force-transmitting means (e.g., a gear) for transmitting a driving force of the motor to the caging member.

In the image stabilized optical system of the present invention with the automatic caging mechanism according to the present invention, when the rotating speed of the motor which rotates the inertial rotor is lowered than a predetermined value, the oscillatable portions such as the erect prism and the inertial rotor are automatically caged. With this operation, even if an operator forgets to execute the caging operation, the oscillatable portions are reliably prevented from colliding with other portions. Therefore, the failure of the image stabilized optical system which would be caused when an operator forgets to cage the oscillatable portions can be prevented further reliably.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
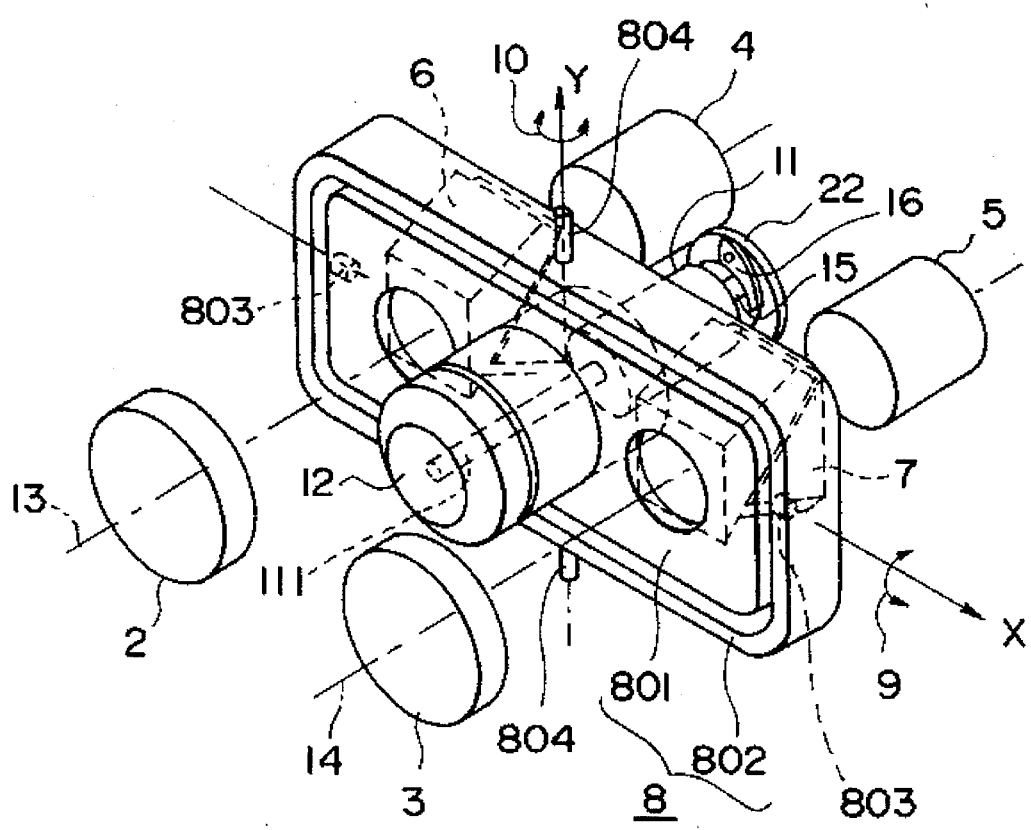
FIG. 1 is a perspective view showing the principle of an example of an image stabilized optical system according to the present invention.

The preferred embodiments of the present invention will be described below with reference to the accompanying drawings. Note that the same reference numerals denote the same parts throughout the drawings.

An embodiment of an image stabilized optical system of the present invention, more specifically, binoculars with an image stabilization function will be described below with reference to FIGS. 1 to 3.

The image stabilized optical system of the present invention comprises a casing 1, objective systems 2 and 3, and eyepiece systems 4 and 5. The objective systems 2 and 3, and the eyepiece systems 4 and 5 are attached to the casing 1. The casing 1 is constituted by an inner casing 101, an objective side casing 102, and an eyepiece side casing 103.

Erect prisms 6 and 7 are respectively arranged between the objective systems 2 and 3, and the eyepiece systems 4 and 5. The erect prisms 6 and 7 are fixed to a two-degree-of-freedom gimbal 8 which is connected to the casing 1 via a first shaft and a second shaft, axes of rotation of the first shaft and the second shaft intersecting at right angle with each other.

More specifically, the gimbal 8 comprises an inner gimbal 801 and an outer gimbal 802. The inner gimbal 801 is connected to the outer gimbal 802 via a set of two first shafts 803 the rotation axes of which extend in a direction substantially parallel to the X-axis in FIG. 1. Therefore, the inner gimbal 801 is capable of oscillating in a tilting direction 9 with respect to the outer gimbal 802. Further, the outer gimbal 802 is connected to the casing 1 via a set of two second shafts 804 the rotation axes of which extend in a direction substantially parallel to the Y-axis in FIG. 1. Therefore, the outer gimbal 802 is capable of oscillating in a panning direction 10 with respect to the casing 1. The erect prisms 6 and 7 are fixed to the inner gimbal 801 which is capable of oscillating in both the tilting direction 9 and the panning direction 10, as described above.

Note that the inner gimbal 801 may be connected to the outer gimbal 802 via a set of shafts (not shown) the rotation axes of which extend in a direction substantially parallel to the Y-axis to be capable of oscillating in the panning direction 10, and the outer gimbal 802 may be connected to the casing 1 via a set of shafts (not shown) the rotation axes of which extend in a direction substantially parallel to the X-axis to be capable of oscillating in the tilting direction 9.

A motor 11 having a rotating rod 111 is fixed to the gimbal 8 (inner gimbal 801). Further, an inertial rotor 12 is supported by the rotating rod 111 of the motor 11, and the inertial rotor 12 can be rotated at high speed by the driving force of the motor 11.

Since the direction (a direction substantially parallel to the rotating rod 111) of the axis of rotation of the inertial rotor 12 with the above arrangement will not change with respect to a still space (strictly speaking, an inertia space) even when a vibration acts on the casing 1, the direction of the inner gimbal 801 will not change with respect to the inertia space, and, therefore, the directions of the erect prisms 6 and 7 will not change with respect to the inertia space. As described above, the directions of the erect prisms 6 and 7 arranged between the objective systems 2 and 3 and the eyepiece systems 4 and 5 will not change even when a vibration acts on the casing 1. Therefore, optical axes 13 and 14 passing the erect prisms 6 and 7 can be stabilized against a disturbance such as a hand vibration, and the image stabilization function of the optical system of the present invention can be achieved.

Such an image stabilized optical system is described in, e.g., U.S. Pat. No. 4,235,506 (corresponding to Japanese Patent Publication No. 57-37852), and U.S. Pat. No. 4,235,506 is incorporated in the present specification as a reference in association with the image stabilization mechanism and the arrangement of the image stabilized optical system excluding a caging mechanism.

The image stabilized optical system comprises a caging mechanism for preventing oscillatable portions such as the erect prisms 6 and 7 and the inertial rotor 12 from moving with respect to the casing 1 so as not to damage the oscillatable portions by colliding with a non-oscillatable portion such as the casing when an operator carries the image stabilized optical system (binoculars) while the power supply thereof is turned off. The image stabilized optical system of the present invention comprises a novel caging mechanism in addition to the above arrangement. The caging mechanism according to the present invention will be described below.

Figure 4:
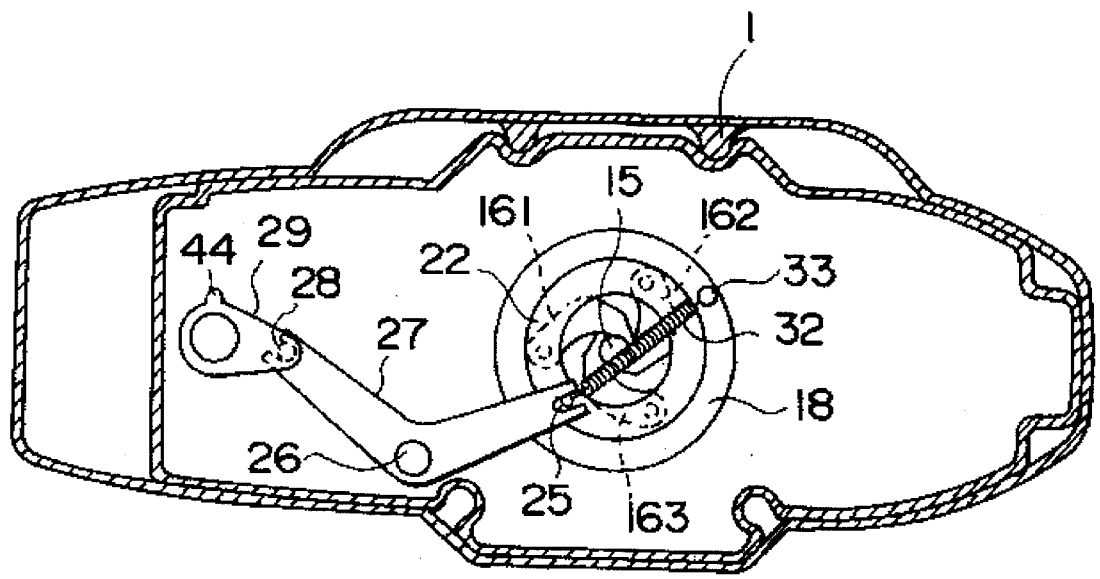
FIG. 4 is a sectional view showing an example of a caging mechanism according to the present invention in the image stabilized optical system of the present invention.

The caging mechanism according to the present invention comprises a rod-like oscillating member 15 fixed to the motor 11 so as to be substantially aligned to the rotating rod 111 of the motor 11, and a caging member 16 which is rotatably attached to the casing 1 and is capable of holding (caging) the oscillating member 15, as shown in FIGS. 1 and 4.

Figure 5:
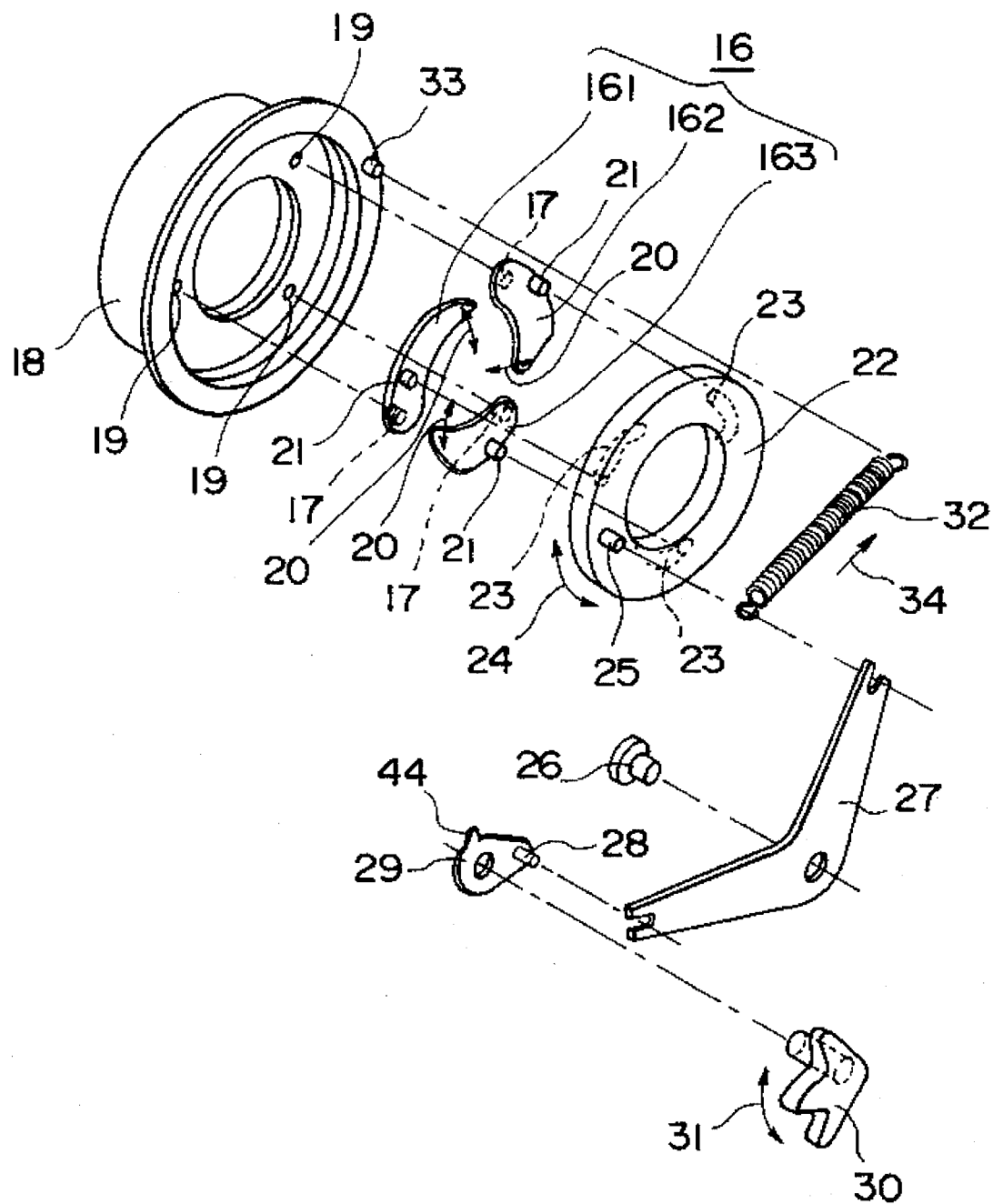
FIG. 5 is an exploded perspective view of the caging mechanism shown in FIG. 4.
Figure 6:
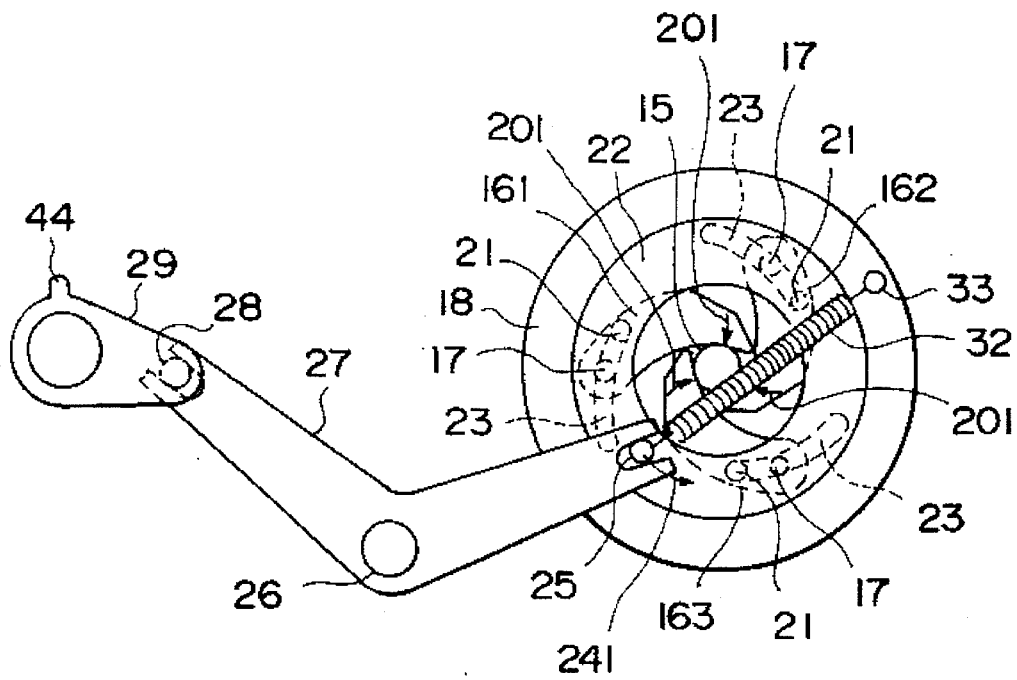
FIG. 6 is a view showing in detail the caging mechanism shown in FIG. 4 in a caging state.
Figure 7:
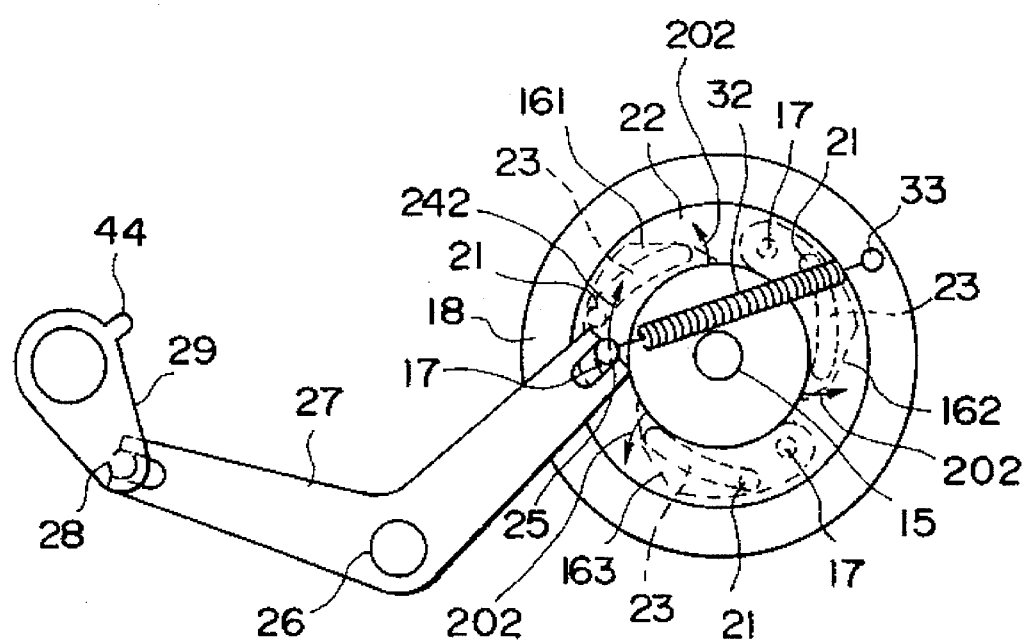
FIG. 7 is a view showing in detail the caging mechanism shown in FIG. 4 in an uncaging state.

In this embodiment, the caging member 16 is constituted by three claws 161 to 163, as shown in FIG. 5. A pivot shaft 17 projecting from near one end of each claw in a direction substantially perpendicular to the major surface of the claw is rotatably inserted in each of holes 19 formed in a fixed ring 18 which is fixed to the inner casing 101. With this arrangement, each claw is capable of pivoting on the pivot shaft 17 in directions of a double-headed arrow 20 with respect to the casing 1. As shown in FIG. 6, when the claws 161 to 163 are in a closed state (caging state), the claws keep in contact with the circumferential surface of the oscillating member 15 to prevent (stop) the oscillation of the oscillating member 15, thereby caging the oscillation of the erect prisms 6 and 7, the inertial rotor 12, arid the like. On the other hand, as shown in FIG. 7, when the claws 161 to 163 are in an open state (uncaging state), the claws separate from the oscillating member 15, and the oscillating member 15 is capable of oscillating. Note that the position of the caging member 16 in the caging state (shown in FIG. 6) is defined as a caging position, and the position of the caging member 16 in the uncaging state (shown in FIG. 7) is defined as an uncaging position.

In this embodiment, a guide pin 21 projects from near the center of each claw in a direction substantially perpendicular to the major surface of each claw and in a direction opposite to the corresponding pivot shaft 17. Each guide pin 21 engages with a corresponding guide groove 23 formed in a surface of an energizing direction-switching ring 22, the surface facing to the guide pin 21. The energizing direction-switching ring 22 is rotatably attached to the fixed ring 18 so that said ring 22 is capable of moving around the oscillating member 15. Each guide groove 23 is formed such that one end thereof is set near the center of the ring and the other end is set away from the center of the ring with this arrangement, the caging member 16 can pivot in the directions of the double-headed arrow 20 in cooperation with the rotational motion (indicated by a double-headed arrow 24) of the energizing direction switching ring 22.

In addition, a force receiving pin 25 is formed on the energizing direction-switching ring 22. An operating force-transmitting means for transmitting an operating force of an operator is connected to the force receiving pin 25. In this embodiment, the operating force-transmitting means comprises a first link 27 one end of which is connected to the force receiving pin 25 and which is attached to the casing 1 with a support pin 26 to freely turn on the support pin 26; a second link 29 connected to the other end of the first link 27 via a pin 28; and a caging switch 30 which is fixed to the second link 29 and arranged outside the casing 1 with this arrangement, the energizing direction-switching ring 22 can be rotated in the directions of the double-headed arrow 24 in cooperation with the turning motion (indicated by a double-headed arrow 31) of the caging switch 30.

The caging mechanism according to the present invention comprises an elastic member 32 in addition to the above arrangement. In the present invention, the elastic member 32 energizes the caging member 16 at the caging position in a direction (indicated by arrows 201) of pressing the caging member 16 against the oscillating member 15 (shown in FIG. 6). On the other hand, the elastic member 32 energizes the caging member 16 at the uncaging position in a direction (indicated by arrows 202) of separating the caging member 16 from the oscillating member 15 (shown in FIG. 7).

In this embodiment, the elastic member 32 is a spring. One end (a first end) of the elastic member 32 is connected to the force receiving pin (force receiving portion) 25 of the energizing direction switching ring 22, and the other end (a second end) is connected to a fixed pin 33 which is fixed to the casing 1. With this arrangement, the elastic member 32 applies a tensile force toward the fixed pin 33 (indicated by an arrow 34) to the force receiving pin 25. A positional relationship between the force receiving pin 25 and the fixed pin 33, i.e.: a positional relationship of two ends of the elastic member 32, is set so that the above tensile force temporarily becomes maximum while the caging member 16 moves between the caging position and the uncaging position. The elastic member 32 is maximally stretched at the point where the above tensile force is maximum.

Figure 8:
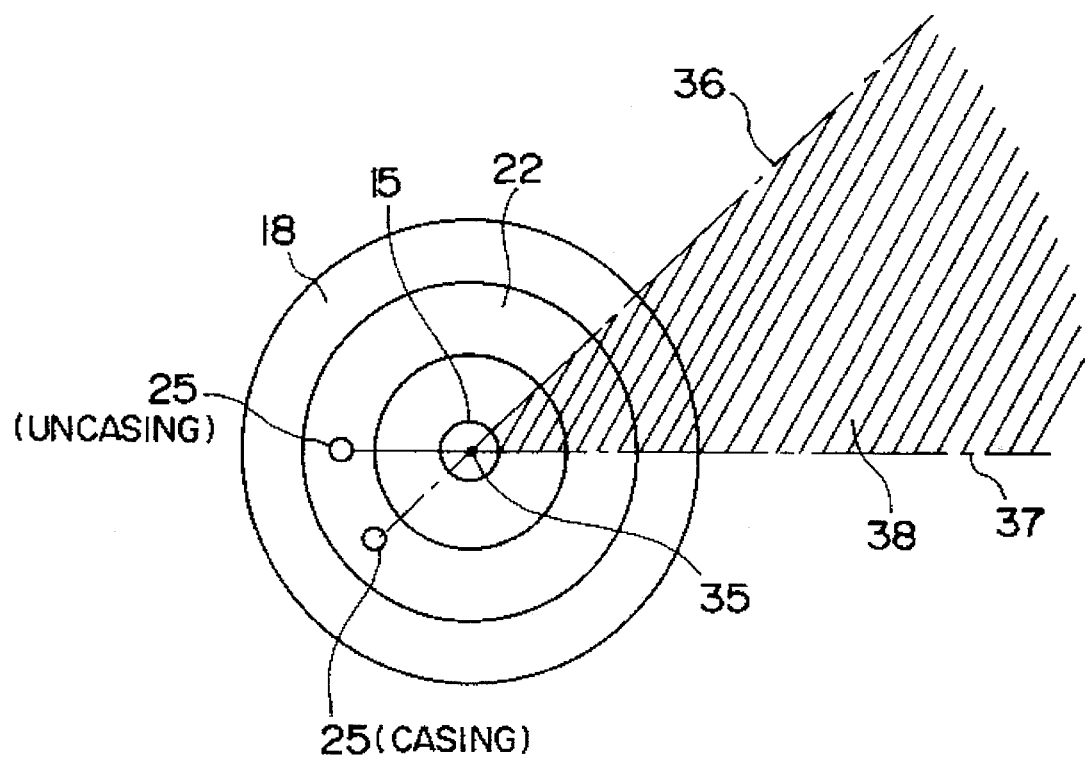
FIG. 8 is a schematic view for explaining a positional relationship of two ends of an elastic member according to the present invention.

Specifically, the positional relationship between the force receiving pin 25 and the fixed pin 33 is preferably set such that a portion of the elastic member 32 crosses a straight line 35 which passes the center of the energizing direction-switching ring 22 and is perpendicular to the major surface of the energizing direction-switching ring 22 while the caging member 16 moves between the caging position and the uncaging position. More specifically, as shown in FIG. 8, the fixed pin 33 is preferably set between a plane 36 passing the position of the force receiving pin 25 in the caging state and the straight line 35, and a plane 37 passing the position of the force receiving pin 25 in the uncaging state and the straight line 35, i.e., at a hatched portion 38 in FIG. 8.

Note that, in this embodiment, one pin serves as both the force receiving pin to which the elastic member 32 is connected and the force receiving pin to which the operating force-transmitting means is connected. Alternatively, two independent pins may be used as the above force receiving pins. In this embodiment, the fixed pin to which the other end (the second end) of the elastic member 32 is connected is formed on the fixed ring 18o Alternatively, it may be formed on another member fixed to the casing 1. Further, in this embodiment, a spring is used as the elastic member 32, but another elastic material such as rubber may be used.

By the elastic member 32 according to the present invention with the above arrangement, the energizing direction-switching ring 22 is energized in a direction indicated by an arrow; 241 in the caging state, thereby energizing the caging member 16 in the direction indicated by the arrows 201 (shown in FIG. 6). Therefore, the oscillating member 15 is reliably held by the caging member 16, and, at the same time, the caging member 16 is pressed against and keeps in contact with the oscillating member 15 by the elastic member 32 to be stably held (locked) at the caging position. On the other hand, the energizing direction switching ring 22 is energized by the elastic member 32 in a direction indicated by an arrow 242 in the uncaging state, thereby energizing the caging member 16 in the direction indicated by the arrows 202 (shown in FIG. 7). Therefore, the oscillating member 15 is free to oscillate, and, at the same time, the caging member 16 is pressed against and keeps in contact with the inner surface of the fixed ring 18 by the elastic member 32 to be stably held (locked) at the uncaging position.

With the caging mechanism according to the present invention, the caging member 16 and the operating force-transmitting means connected thereto are stably held (locked) at any one of the caging and uncaging positions by the elastic member 32. For this reason, an additional lock mechanism for holding the caging member at the caging position and/or the uncaging position need not be provided to another member such as the operating force-transmitting means. Therefore, the caging mechanism according to the present invention has a simple arrangement as compared to a conventional one, and the use of the caging mechanism according to the present invention achieves weight and cost reductions of the image stabilized optical system. Further, when the caging mechanism according to the present invention is to be operated, an operator need not release any additional lock mechanism, so the caging mechanism according to the present invention is easily operated as will be describe later.

The operation of the caging mechanism according to the present invention will be described in detail below with reference to FIGS. 6 and 7.

First, the caging switch 30 is operated to move the second link 29 from a position shown in FIG. 7 to a position shown in FIG. 6. The first link 27 receives a force from the second link 29 via the pin 28 and turns round the support pin 26 to be set to the position shown in FIG. 6. Therefore, the energizing direction switching ring 22 receives a force from the first link 27 via the force receiving pin 25 and rotates counterclockwise (i.e., in the direction indicated by the arrow 241) in the fixed ring 18 to be set in a state shown in FIG. 6. When the ring 22 rotates counterclockwise, the positions of the guide pins 21 accommodated in the guide grooves 23 move inward in the radial direction of the ring 22, and the claws 161 to 163 are closed to keep in contact with the circumferential surface of the oscillating member 15, as shown in FIG. 6, thereby caging the oscillation of the oscillating member 15 (i.e., in the caging state).

At this state, since the elastic member (spring) 32 applies a tensile force between the force receiving pin 25 and the fixed pin 33, the ring 22 will continue to rotate counterclockwise (i.e., in the direction indicated by the arrow 241). Therefore, the claws 161 to 163 keep in contact with the circumferential surface of the oscillating member 15 while applying a pressure thereto, and are stably held in a closed state (i.e., at the caging positions), as shown in FIG. 6.

Next, the caging switch 30 is operated to rotate the second link 29 clockwise and move it from the position shown in FIG. 6 to the position shown in FIG. 7. The first link 27 receives a force from the second link 29 via the pin 28 and turns counterclockwise round the support pin 26 to be set to the position shown in FIG. 7. Therefore, the energizing direction-switching ring 22 receives a force from the first link 27 via the force receiving pin 25 and rotates clockwise (i.e., in the direction indicated by the arrow 242) in the fixed ring 18 to be set in a state shown in FIG. 7.

At this time, the elastic member 32 is set from the state shown in FIG. 6 to a state shown in FIG. 7 through a state wherein its length is maximum (i.e., a point wherein its tensile force is maximum). Therefore, in order to rotate the ring 22, an operator merely rotate the caging switch 30 against the force of one elastic member 32, and need not release any separately provided lock mechanism.

When the ring 22 rotates clockwise, the positions of the guide pins 21 accommodated in the guide grooves 23 move outward in the radial direction of the ring 22, and the claws 161 to 163 are opened to allow the oscillating member 15 to freely oscillate (i.e., in the uncaging state).

At this state, since the elastic member 32 applies a tensile force between the force receiving pin 25 and the fixed pin 33, the ring 22 will continue to rotate clockwise (i.e., in the direction indicated by the arrow 242). On the other hand, in the state shown in FIG. 7, since the claws 161 to 163 keep in contact with the inner surface of the fixed ring 18, and the guide pins 21 is in contact with the end portions of the guide grooves 23, the claws 161 to 163 cannot be opened to a degree larger than that in the state shown in FIG. 7. Therefore, the claws 161 to 163 are stably held in the open state (i.e., at the uncaging positions), as shown in FIG. 7.

The elastic member 32 energizes, in either of the clockwise and counterclockwise directions, the ring 22 at a position where the length of the elastic member 32 is maximum, i.e., at an unstable position where the rotational direction is not settled. When the ring 22 is at such an unstable position, the direction in which a tensile force of the elastic member 32 acts is set on the outer diameter of the ring 22, this diameter being through the center of the ring 22.

In the caging mechanism according to the present invention, the claws 161 to 163 can be opened/closed merely by rotating the caging switch 30 connected to the second link 29. When the claws 161 to 163 keep in contact with the circumferential surface of the oscillating member 15 (i.e., at the caging position shown in FIG. 6), the oscillation of the gimbal 8, the erect prisms 6 and 7, and the inertial rotor 12 which are fixed to the oscillating member 15 are caged. On the other hand, when the claws 161 to 163 are open (i.e., at the uncaging position shown in FIG. 7), the oscillating member 15 is free to oscillate, so the gimbal 8, the erect prisms 6 and 7, and the inertial rotor 12 are also free to oscillate.

As mentioned above, in the caging mechanism according to the present invention, the caging position and the uncaging position can be switched only by rotating the caging switch. Some operators, however, may forget to operate, the caging switch when the switch of a power supply for the motor is turned off. If an operator carries this system in a state wherein the erect prisms and the like are uncaged (free), the oscillatable portions may collide with other portions to degrade the precision of precision devices such as the erect prisms.

The image stabilized optical system of the present invention, therefore may comprise a caution device according to the present invention. The caution device according to the present invention will be described below.

Figure 9:
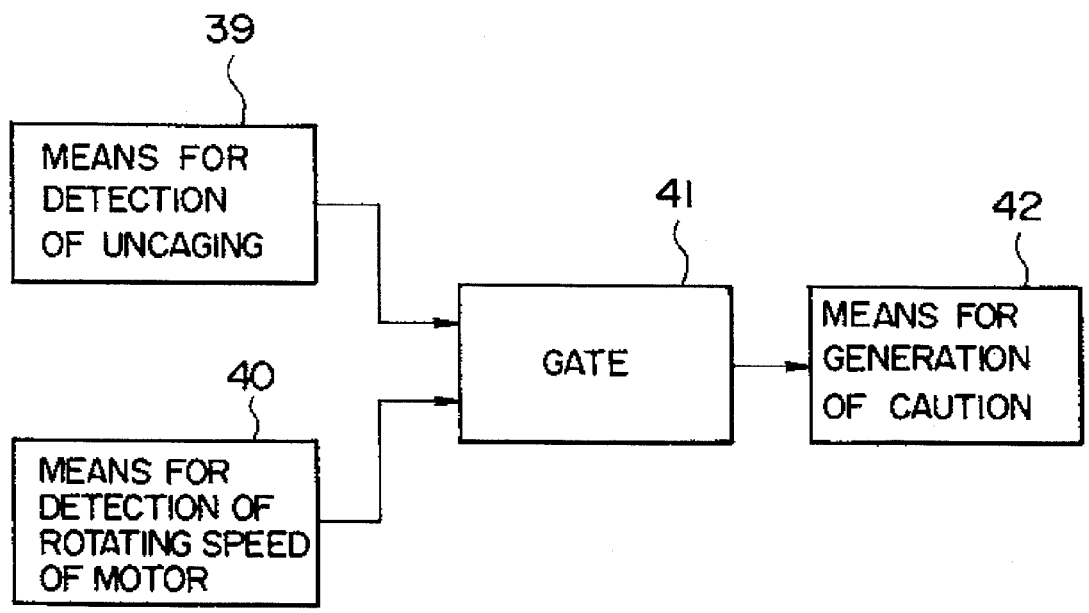
FIG. 9 is a block diagram showing an example of a caution device according to the present invention.

The caution device according to the present invention is a caution device which generates a caution when the caging member 16 is at the uncaging position, and the rotating speed of the motor 11 is lower than a predetermined value. For example, as shown in a block diagram of FIG. 9, the caution device comprises a means 39 for detection of uncaging which detects that the caging member 16 is at the uncaging position and generates a signal; a means 40 for detection of the rotating speed of the motor which detects that the rotating speed of the motor 11 becomes lower than a predetermined value and generates a signal; a gate 41 which receives signals generated by the means 39 for detection of uncaging and the means 40 for detection of the rotating speed of the motor and generates an output signal on the basis of the received signals; and a means 42 for generation of a caution which generates a caution on the basis of the output signal.

Figure 10:
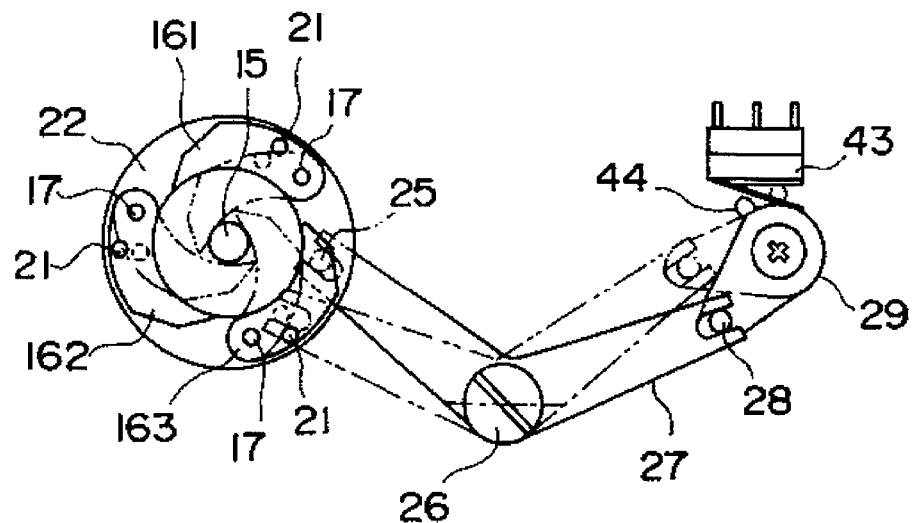
FIG. 10 is a front view showing an example of the caging mechanism with the caution device according to the present invention.

As shown in FIG. 10, the means 39 for detection of uncaging in this embodiment is a limit switch 43 connected to the operating force-transmitting means. More specifically, a projecting portion 44 is formed on the second link 29 connected to the caging switch 30, and is arranged to be capable of coming in contact with the limit switch 43. When the caging switch 30 is rotated to arrange the claws 161 to 163 at the caging positions, the projecting portion 44 keeps in contact with the limit switch 43. On the other hand, when the claws 161 to 163 are arranged at the uncaging positions, the projecting portion 44 is separated from the limit switch 43. Therefore, by ON/OFF operations of the limit switch 43, it is detected that the claws 161 to 163 are opened/closed, i.e., that the oscillation of the erect prisms 6 and 7, the inertial rotor 12, and the like are caged(locked) / uncaged-(freed). In accordance with the position of the caging member 16 (i.e., at the caging or uncaging position), a signal is generated by the limit switch 43.

Note that the attachment position and a detailed arrangement of the limit switch are not limited to the above arrangement, and the limit switch may be provided in association with the first link 27 or the energizing direction-switching ring 22. The means 39 for detection of uncaging is not limited to the above limit switch. It may be any member as long as this detects the caging member 16 at the uncaging position to generate a signal.

Figure 2:
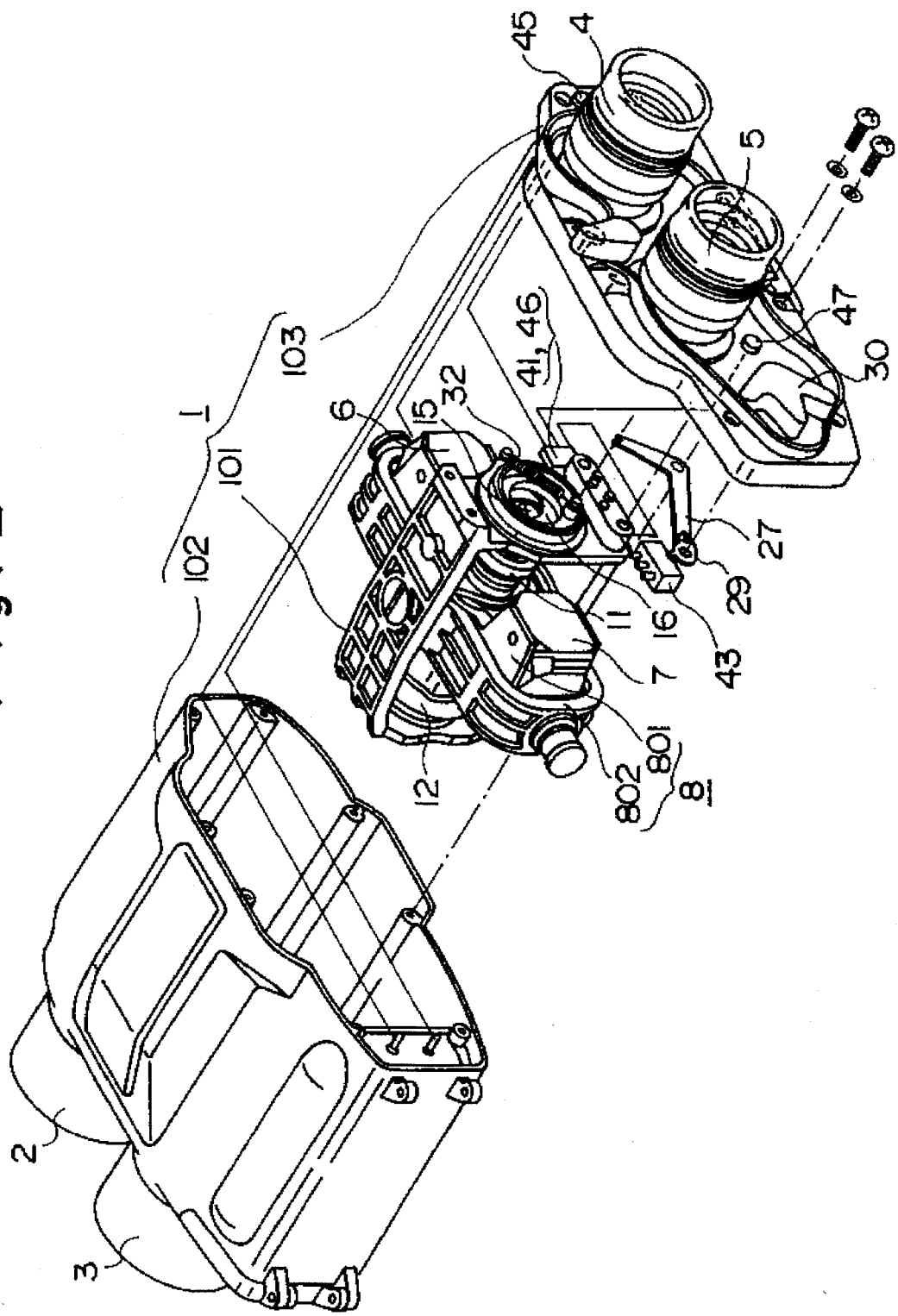
FIG. 2 is an exploded perspective view showing an example of the image stabilized optical system according to the present invention.
Figure 3:
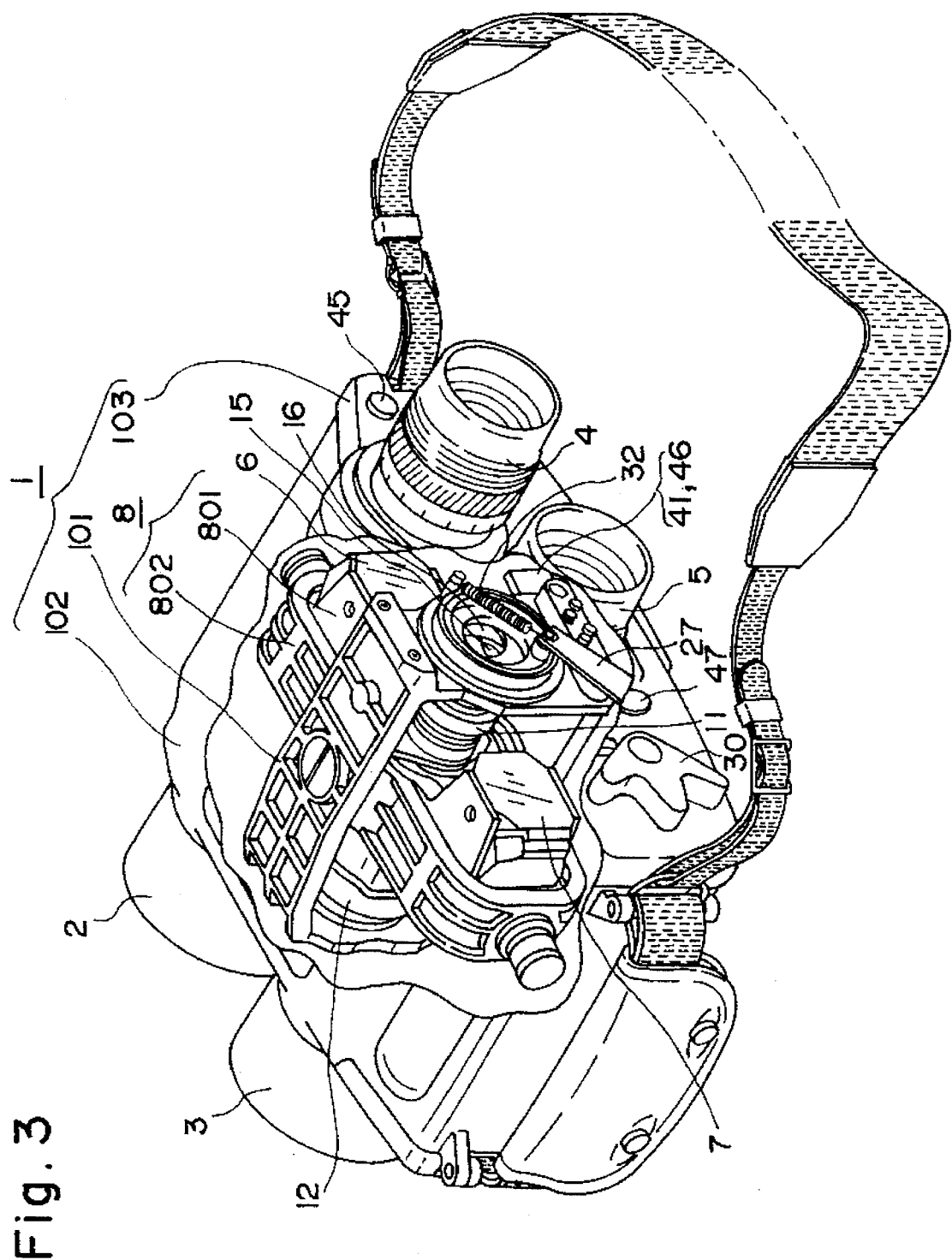
FIG. 3 is a partially cutaway perspective view of the image stabilized optical system shown in FIG. 2.

As shown in FIG. 2, the means 40 for detection of the rotating speed of the motor in this embodiment is a switch 45 of a power supply for the motor. That is, it is determined by ON/OFF operations of the switch 45 of the power supply for the motor whether or not the inertial rotor 12 rotates at a predetermined rotating speed or more. This switch 45 of the power supply for the motor is a switch with two circuits, in which a current flows via one circuit to the motor 11 and a signal for cautioning an operator against forgetting to cage (to be described later) is transferred via the other circuit. In this manner, when the power to be supplied to the motor 11 is shut off, the switch 45 of the power supply for the motor detects that the rotating speed of the motor 11 becomes lower than the predetermined value, and generates a signal in accordance with ON/OFF operations of a motor current.

Note that any means can be used as the means 40 for detection of the rotating speed of the motor according to the present invention as long as it can detect the rotating speed of the motor 11 lower than a predetermined value and generate a signal. The means 40 for detection of the rotating speed of the motor may be a means which detects a decrease in rotating speed of the motor 11 by directly measuring its rotating speed with a tacho-generator or an encoder, and generates a signal. Further, the means 40 for detection of the rotating speed of the motor may be a voltage measuring device which detects a decrease in rotating speed of the motor 11 by measuring a voltage applied to the motor 11, and generates a signal.

As shown in FIG. 2, the gate 41 of this embodiment is connected to the means 39 for detection of uncaging and the means 40 for detection of the rotating speed of the motor, and generates an output signal by performing an AND operation of signals which are generated by these means 39 and 40. Note that a detailed arrangement and a connecting method of the gate 41 is not limited to specific ones.

As shown in FIG. 2, the means 42 for generation of a caution in this embodiment comprises an oscillating circuit 46 connected to the gate 41 and an LED 47. The oscillating circuit 46 is driven in accordance with a signal output from the gate 41, and then the LED 47 emits light (blinked light). The means 42 for generation of a caution is not particularly limited to the LED, and may be a liquid crystal display or a buzzer.

Figure 11:
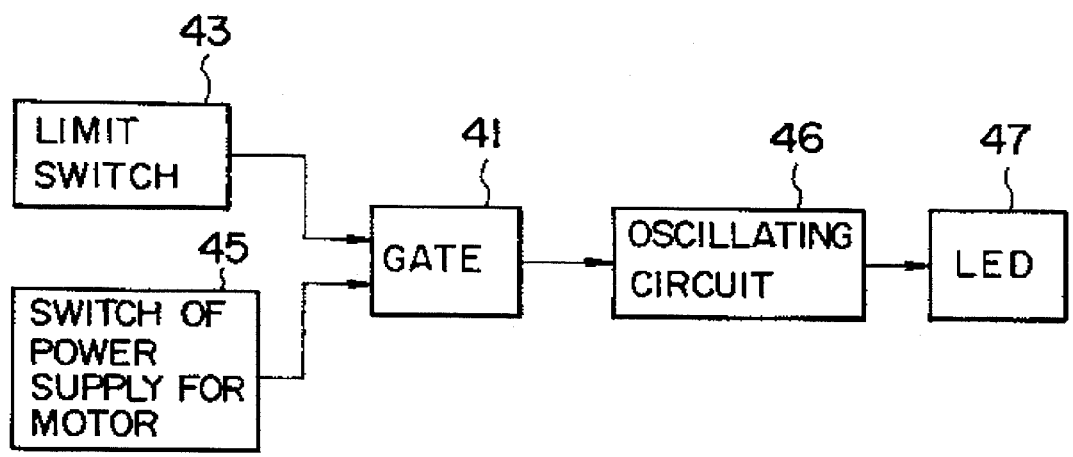
FIG. 11 is a block diagram showing an example of the caution device according to an embodiment of the present invention.

FIG. 11 is a block diagram showing the caution device of this embodiment. As described above, the caging member 16 at the uncaging position is detected by the limit switch 43, and the rotating speed of the motor 11 is detected by the switch 45 of the power supply for the motor. Signals respectively output from the limit switch 43 and the switch 45 of the power supply for the motor are subjected to an AND operation by the gate 41, the oscillating circuit 46 is driven in accordance with a signal output from the gate 41, and then the LED 47 emits light. That is, when the oscillation of the erect prisms 6 and 7, the inertial rotor 12, and the like are uncaged, and the switch 45 of the power supply for the motor is turned off, the LED 47 emits light in accordance with the oscillating circuit 46 to generate a caution to an operator. This caution informs the operator that the erect prisms 6 and 7 and the like may collide with other members to cause the failure of the binoculars if the operator carries the binoculars in this state to give a vibration to them. The operator operates the caging switch 30 to close the claws 161 to 163, thereby caging the oscillation of the erect prisms 6 and 7, the inertial rotor 12, and the like.

The image stabilized optical system of the present invention which comprises the caution device according to the present invention can give a caution to an operator when the operator forgets to cage the oscillatable portions though the operator turns off the switch of power supply for the motor of the image stabilized optical system. For this reason, any failure which would be caused by carrying the system while the oscillatable portions are uncaged can be prevented reliably.

As means for more reliably preventing the failure which would be caused when an operator forgets to cage the oscillatable portions, the image stabilized optical system of the present invention may comprise an automatic caging mechanism according to the present invention. The automatic caging mechanism according to the present invention will be described hereinafter.

Figure 12:
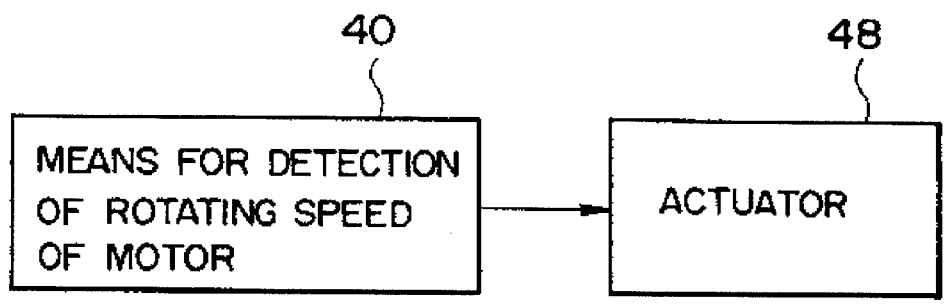
FIG. 12 is a block diagram showing an example of an automatic caging mechanism according to the present invention.

The automatic caging mechanism according to the present invention comprises, as shown in a block diagram of FIG. 12, a means 40 for detection of the rotating speed of the motor which detects that the rotating speed of the motor 11 becomes lower than a predetermined value and generates a signal; and an actuator 48 which receives the signal generated by the means 40 for detection of the rotating speed of the motor and moves the caging member 16 to the caging position on the basils of the received signal.

The means 40 for detection of the rotating speed of the motor in this embodiment may be the switch 45 of the power supply for the motor. Further, the means 40 for detection of the rotating speed of the motor may be a means which detects a decrease in rotating speed of the motor 11 by directly measuring its rotating speed with a tacho-generator or an encoder, and generates a signal. Furthermore, the means 40 for detection of the rotating speed of the motor may be a voltage measuring device which detects a decrease in rotating speed of the motor 11 by measuring a voltage applied to the motor 11, and generates a signal.

Figure 13:
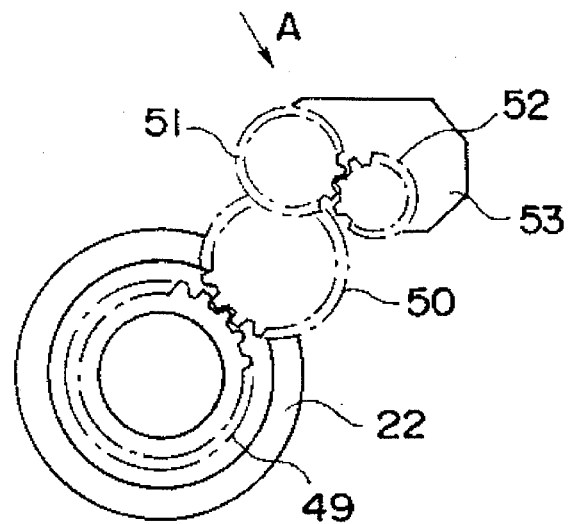
FIG. 13 is a front view showing an example of an actuator of the automatic caging mechanism according to the present invention.
Figure 14:
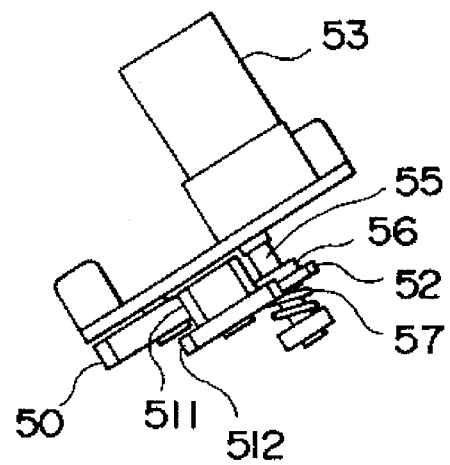
FIG. 14 is a side view of the actuator in FIG. 13 viewed from a direction indicated by an arrow A in FIG. 13.

As shown in FIGS. 13 and 14, the actuator 48 of this embodiment comprises a gear 49 fixed to the energizing direction-switching ring 22, gears 50, 51, and 52 sequentially engaged with the gear 49, a motor 53 connected to the gear 52, and a driving circuit 54 for driving the motor 53 on the basis of a signal generated by the means 40 for detection of the rotating speed of the motor.

The actuator 48 will be described below in detail. Referring to FIG. 13, the gear 49 is fixed to the energizing direction-switching ring 22, and the energizing direction-switching ring 22 and the gear 49 are rotated integrally. The gear 49 is meshed with the gear 50. FIG. 14 is a view showing the actuator 48 viewed from a direction indicated by an arrow A in FIG. 13. As shown in FIG. 14, the gear 50 is meshed with a gear 511. The gear 511 is fixed to a gear 512 to constitute the gear 51. The gear 512 is meshed with the gear 52. The gear 52 is connected to a rotating rod 55 of the motor 53 and is rotated in accordance with the power of the motor 53. With the series of gears 49 to 52, the rotating speed of the motor 53 is decreased, and a torque is increased.

A plate 56 is fixed to the rotating rod 55 of the motor 53. The gear 52 is pressed against the plate 56 by a compression force of a spring 57. Therefore, when a heavy load is applied to the gear 52, the gear 52 and the plate 56 slip from each other, preventing an excessive load from being applied to the motor 53.

with the actuator 48 having the above structure, the ring 22 is rotated in accordance with the rotation of the motor 53 to move the caging member 16 from the uncaging position to the caging position, thereby caging the oscillation of the erect prisms 6 and 7, the inertial rotor 12, and the like.

The automatic caging mechanism according to the present invention preferably further comprises a timer 58 for controlling the driving time of the motor 53. If the timer 58 is connected to the driving circuit 54, the motor 53 is kept in an operating state for a predetermined period of time, so that the caging member 16 can be caged further reliably, and, at the same time, wasteful power consumption upon completion of the caging can be suppressed.

The automatic caging mechanism according to the present invention may further comprise a means for detection of caging (e.g., the limit switch 43) which detects the movement of the caging member 16 to the caging position and generates a signal to stop the actuator 48, in place of the timer 58. That is, when it is detected by the limit switch or the like that the caging member 16 is moved to a position (caging position) where the caging member 16 sufficiently comes in contact with the oscillating member 15, the motor 53 may be stopped in accordance with a signal output from the limit switch or the like. Further, by measuring the position of the ring 22 or the rotating speed of the gears 49 to 52 or the motor 53, the position of the caging member 16 may be detected.

Note that the actuator 48 of this embodiment comprises the motor 53, but may comprise a solenoid or the like.

Figure 15:
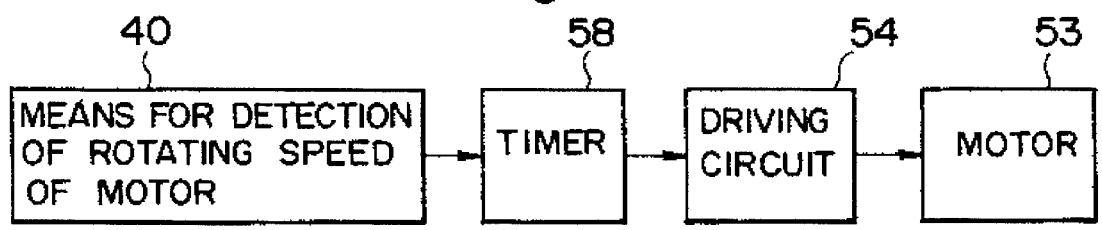
FIG. 15 is a block diagram showing an example of the automatic caging mechanism according to an embodiment of the present invention.

The operation of caging the oscillatable portions by the automatic caging mechanism of this embodiment will be described below with reference to FIG. 15. First, it is detected by the means 40 for detection of the rotating speed of the motor whether or not the rotating speed of the motor 11 is lower than a predetermined value, and a signal is generated by the means 40. If a decrease in rotating speed of the motor 11 is detected by the means 40 for detection of the rotating speed of the motor, power is supplied from the driving circuit 54 with the timer 58 to the motor 53 in accordance with the signal to rotate the motor 53. With the rotational force of the motor 53, the caging member 16 is moved from the uncaging position to the caging position by the gear mechanism described above to come in contact with the oscillating member 15. Thus, the oscillation of the erect prisms 6 and 7, the inertial rotor 12, and the like are caged. Upon completion of the caging, the timer 58 operates to open the driving circuit 54, stopping the rotating motion of the motor 53.

In the image stabilized optical system of the present invention with the automatic caging mechanism according to the present invention, when the switch of the power supply for the motor is turned off to decrease the rotating speed of the motor 11, the oscillatable portions such as the erect prisms 6 and 7, and the inertial rotor 12 are automatically caged. Therefore, any failure of the image stabilized optical system which would be caused when an operator forgets to cage the oscillatable portions can be prevented reliably.

This embodiment has exemplified the image stabilized binoculars. However, the image stabilized optical system may be applied to other optical systems such as telescopes.

As has been described above, according to the caging mechanism of the present invention, the caging member and the operating force-transmitting means connected thereto are stably held (locked) at any one of the caging and uncaging positions by the elastic member. For this reason, an additional lock mechanism for holding the caging member at the caging position and/or the uncaging position need not be provided to another member such as the operating force-transmitting means. Therefore, the caging mechanism according to the present invention has a simple arrangement as compared to a conventional one, and the use of the caging mechanism according to the present invention achieves weight and cost reductions of the image stabilized optical system. Further, when the caging mechanism according to the present invention is to be operated, an operator need not release any additional lock mechanism, so the caging mechanism according to the present invention is easily operated.

In addition, a conventional image stabilized optical system cannot rapidly change a view field due to its image stabilization function when the angle of the casing is changed slightly. According to the caging mechanism of the present invention, however, since the caging and uncaging positions can be rapidly switched, a view field can be rapidly changed while observation and the like are performed.

Further, according to the image stabilized optical system of the present invention with the caution device according to the present invention, the caution device generates a caution when the caging mechanism for caging the oscillation of the erect prisms and the like is at the uncaging position, and the rotating speed of the motor which rotates the inertial rotor at high speed is lower than a predetermined value. Therefore, according to the present invention, a caution is given to an operator when the operator forgets to cage the oscillatable portions though the operator turns off the power switch for the motor of the image stabilized optical system. For this reason, the failure which would be caused by carrying the system while the oscillatable portions are uncaged can be prevented reliably.

Furthermore, according to the image stabilized optical system of take present invention with the automatic caging mechanism according to the present invention, when the rotating speed of the motor which rotates the inertial rotor is lower than a predetermined value, the oscillatable portions such as the erect prisms and the inertial rotor are automatically caged. With this operation, even if an operator forgets to execute the caging operation, the oscillatable portions such as the erect prisms and the inertial rotor are reliably prevented from colliding with other portions. Therefore, the failure of the image stabilized optical system which would be caused when an operator forgets to cage the oscillatable portions can be prevented further reliably.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 6-096508 (096508/1994) filed on May 10, 1994; 6-096517 (096517/1994) filed on May 10, 1994; and 6-096533 (096533/1994) filed on May 10, 1994 are hereby incorporated by reference.

What is claimed is:

1. An image stabilized optical system comprising:

a casing;

an objective system and an eyepiece system which are attached to said casing;

a gimbal which is connected to said casing via a shaft, so that said gimbal is capable of oscillating in tilting and panning directions;

an erect prism which is arranged between said objective system and said eyepiece system, and is attached to said gimbal;

a motor which is attached to said gimbal;

an inertial rotor which is supported by a rotating rod of said motor;

an oscillating member which is attached to said gimbal and is capable of oscillating together with said erect prism;

a caging member which is rotatably attached to said casing, said caging member being capable of moving between a caging position where said caging member keeps in contact with said oscillating member to prevent oscillation of said oscillating member, and an uncaging position where said caging member is separated from said oscillating member to allow said oscillating member to freely oscillate;

operating force-transmitting means for transmitting an operating force of an operator to said caging member to move said caging member between the caging position and the uncaging position; and an elastic member for forcing said caging member at the caging position in a direction of pressing said caging member against said oscillating member, and forcing said caging member at the uncaging position in a direction of separating said caging member from said oscillating member.

2. A system according to claim 1, further comprising an energizing direction-switching member which is rotatably attached to said casing, said energizing direction-switching member moving said caging member between the caging position and the uncaging position in cooperation with a rotating operation of said energizing direction-switching member, so that said elastic member energizes said caging member via said energizing direction-switching member, and said operating force-transmitting means transmits an operating force to said caging member via said energizing direction-switching member.

3. A system according to claim 2, wherein said energizing direction-switching member has a ring-like shape.

4. A system according to claim 2, wherein said elastic member has a first end connected to a force receiving portion of said energizing direction-switching member, and a second end connected to a part of said casing; and said elastic member applies a tensile force between said force receiving portion and said casing, said tensile force temporarily becoming maximum while said caging member moves between the caging position and the uncaging position.

5. A system according to claim 2, wherein the first end and the second end of said elastic member are connected to said energizing direction-switching member and said casing, respectively, so that a portion of said elastic member crosses a straight line which passes a center of said energizing direction-switching member and is perpendicular to a major surface of said energizing direction-switching member while said caging member moves between the caging position and the uncaging position.

6. An image stabilized optical system comprising:

a casing;

an objective system and an eyepiece system which are attached to said casing;

a gimbal which is connected to said casing via a shaft, so that said gimbal is capable of oscillating in tilting and panning directions;

an erect prism which is arranged between said objective system and said eyepiece system, and is attached to said gimbal;

a motor which is attached to said gimbal;

an inertial rotor which is supported by a rotating rod of said motor;

an oscillating member which is attached to said gimbal and is capable of oscillating together with said erect prism;

a caging member which is rotatably attached to said casing, said caging member being capable of moving between a caging position where said caging member keeps in contact with said oscillating member to prevent oscillation of said oscillating member, and an uncaging position where said caging member is separated from said oscillating member to allow said oscillating member to freely oscillate;

operating force-transmitting means for transmitting an operating force of an operator to said caging member to move said caging member between the caging position and the uncaging position; and a caution device for generating a caution when said caging member is at the uncaging position, and a rotating speed of said motor is lower than a predetermined value.

7. A system according to claim 6, wherein said caution device comprises:

means for detection of uncaging, which detects that said caging member is at the uncaging position and generates a signal;

means for detection of the rotating speed of said motor, which detects that the rotating speed of said motor becomes lower than the predetermined value and generates a signal;

a gate which receives the signals generated by said means for detection of uncaging and said means for detection of the rotating speed of said motor and generates an output signal based on both the received signals; and means for generation of a caution for generating a caution based on the output signal.

8. A system according to claim 7, wherein said means for detection of the rotating speed of the motor is a switch of a power supply for said motor, and said means detects that the rotating speed of said motor becomes lower than the predetermined value when power is shut off to be supplied to said motor.

9. A system according to claim 7, wherein said means for detection of the rotating speed of said motor is a member selected from the group of a tacho-generator and an encoder, and said means detects that the rotating speed of said motor becomes lower than the predetermined value by directly measuring the rotating speed of said motor.

10. A system according to claim 7, wherein said means for detection of the rotating speed of said motor is a voltage measuring device, and said means detects that the rotating speed of said motor becomes lower than the predetermined value by measuring an applied voltage to said motor.

11. A system according to claim 7, wherein said means for detection of uncaging is a limit switch connected to said operating force-transmitting means.

12. An image stabilized optical system comprising:

a casing;

an objective system and an eyepiece system which are attached to said casing;

a gimbal which is connected to said casing via a shaft, so that said gimbal is capable of oscillating in tilting and panning directions;

an erect prism which is arranged between said objective system and said eyepiece system, and is attached to said gimal;

a motor which is attached to said gimbal;

an inertial rotor which is supported by a rotating rod of said motor;

an oscillating member which is attached to said gimbal and is capable of oscillating together with said erect prism;

a caging member which is rotatably attached to said casing, said caging member being capable of moving between a caging position where said caging member keeps in contact with said oscillating member to prevent oscillation of said oscillating member, and an uncaging position where said caging member is separated from said oscillating member to allow said oscillating member to freely oscillate;

means for detection of a rotating speed of said motor, which detects that the rotating speed of said motor becomes lower than a predetermined value and generates a signal; and an actuator which receives the signal generated by said means for detection of the rotating speed of said motor and moves said caging member based on the received signal.

13. A system according to claim 12, wherein said means for detection of the rotating speed of said motor is a voltage measuring device, and said means detects that the rotating speed of said motor becomes lower than the predetermined value by measuring an applied voltage to said motor.

14. A system according to claim 12, wherein said means for detection of the rotating speed of said motor is a switch of a power supply for said motor, and said means detects that the rotating speed of said motor becomes lower than the predetermined value when power is shut off to be supplied to said motor.

15. A system according to claim 12, wherein said means for detection of the rotating speed of said motor is a member selected from the group of a tacho-generator and an encoder, and said means detects that the rotating speed of said motor becomes lower than the predetermined value by directly measuring the rotating speed of said motor.

16. A system according to claim 12, further comprising a timer for keeping said actuator in an operating state for a predetermined period of time.

17. A system according to claim 12, further comprising means for detection of caging which detects movement of said caging member to the caging position and generates a signal; and said actuator is stopped based on the signal generated by said means for detection of caging.

18. A system according to claim 12, further comprising an energizing direction-switching member which is rotatably attached to said casing, said energizing direction-switching member moving said caging member between the caging position and the uncaging position in cooperation with a rotating operation of said energizing direction-switching member, so that said actuator transmits a driving force to said caging member via said energizing direction-switching member.

19. A system according to claim 12, wherein said actuator comprises a motor, and driving force transmitting means for transmitting a driving force of said motor to said caging member.

* * * * *

UNITED STATES PATENT AND TRADEMARK OFFICE
CERTIFICATE OF CORRECTION

PATENT NO.   :   5,539,575
DATED        :   July 23, 1996
INVENTOR(S)  :   Kakizawa et al.

It is certified that error appears in the above-indentified patent and that said Letters Patent is hereby corrected as shown below:

Column 16, Line 6, change "gimal" to --gimbal--;

Signed and Sealed this

Seventh Day of January, 1997

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,539,575
DATED : July 23, 1996
INVENTOR(S) : Kakizawa et al.

It is certified that error appears in the above-indentified patent and that said Letters Patent is hereby corrected as shown below:

Column 16, Line 63, after "force" insert -- - --.

Signed and Sealed this

Tenth Day of June, 1997

Attest:

BRUCE LEHMAN

Attesting Officer

Commissioner of Patents and Trademarks